United States Patent
Harada

(10) Patent No.: US 8,271,282 B2
(45) Date of Patent: Sep. 18, 2012

(54) VOICE RECOGNITION APPARATUS, VOICE RECOGNITION METHOD AND RECORDING MEDIUM

(75) Inventor: Shouji Harada, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 778 days.

(21) Appl. No.: 12/433,077

(22) Filed: Apr. 30, 2009

(65) Prior Publication Data

US 2010/0010813 A1  Jan. 14, 2010

(30) Foreign Application Priority Data

Jul. 10, 2008  (JP) ................................. 2008-180515

(51) Int. Cl.
G10L 15/04 (2006.01)
G10L 15/18 (2006.01)
G06F 17/21 (2006.01)

(52) U.S. Cl. ........... 704/251; 704/10; 704/252; 704/257

(58) Field of Classification Search ........................ None
See application file for complete search history.

(56) References Cited

U.S. PATENT DOCUMENTS

| | | | | |
|---|---|---|---|---|
| 5,649,057 A * | 7/1997 | Lee et al. | ...................... | 704/256 |
| 5,845,245 A * | 12/1998 | Gupta et al. | .................. | 704/231 |
| 5,920,839 A | 7/1999 | Iso | | |
| 6,016,470 A * | 1/2000 | Shu | ............... | 704/244 |
| 6,076,054 A * | 6/2000 | Vysotsky et al. | ............. | 704/240 |
| 6,192,337 B1 * | 2/2001 | Ittycheriah et al. | ........... | 704/231 |
| 6,195,634 B1 * | 2/2001 | Dudemaine et al. | .......... | 704/231 |
| 6,243,677 B1 * | 6/2001 | Arslan et al. | .................. | 704/244 |
| 6,308,152 B1 * | 10/2001 | Konuma et al. | ............... | 704/238 |
| 6,535,850 B1 * | 3/2003 | Bayya | ........................... | 704/239 |
| 6,778,959 B1 * | 8/2004 | Wu et al. | ........................ | 704/256 |
| 6,850,885 B2 * | 2/2005 | Raddino et al. | ............... | 704/236 |
| 7,016,827 B1 * | 3/2006 | Ramaswamy et al. | ............ | 704/9 |
| 7,392,188 B2 * | 6/2008 | Junkawitsch et al. | ......... | 704/251 |
| 7,640,160 B2 * | 12/2009 | Di Cristo et al. | ............. | 704/257 |

(Continued)

FOREIGN PATENT DOCUMENTS

EP  0 947 980 A1  10/1999

(Continued)

OTHER PUBLICATIONS

Chinese Office Action issued Dec. 3, 2010 in corresponding Chinese Patent Application 200910136975.6.

(Continued)

*Primary Examiner* — Brian Albertalli
(74) *Attorney, Agent, or Firm* — Staas & Halsey LLP

(57) ABSTRACT

A voice recognition apparatus includes an extraction unit extracting a feature amount from a voice signal, a word dictionary storing a plurality of recognition words; a reject word generation unit storing reject words in the word dictionary in association with the recognition words and a collation unit calculating a degree of similarity between the voice signal and each of the recognition words and reject words stored in the word dictionary by using the feature amount extracted by the extraction unit, determining whether or not a word having a high calculated degree of similarity corresponds to a reject word, when the word is determined as the reject word, excluding the recognition word stored in the word dictionary in association with the reject word from a result of recognition, and outputting a recognition word having a high calculated degree of similarity as a result of recognition.

9 Claims, 10 Drawing Sheets

U.S. PATENT DOCUMENTS

| | | | |
|---|---|---|---|
| 7,657,430 B2 * | 2/2010 | Ogawa | 704/243 |
| 7,962,338 B2 * | 6/2011 | Harada | 704/251 |
| 2005/0119883 A1 | 6/2005 | Miyazaki et al. | |
| 2006/0106604 A1 | 5/2006 | Okimoto | |

FOREIGN PATENT DOCUMENTS

| | | |
|---|---|---|
| JP | 1-179198 | 7/1989 |
| JP | 5-197388 | 8/1993 |
| JP | 6-208392 | 7/1994 |
| JP | 10-171488 | 6/1998 |
| JP | 11-282486 | 10/1999 |
| JP | 11-288295 | 10/1999 |
| JP | 2001-147698 | 5/2001 |
| JP | 2002-358097 | 12/2002 |
| JP | 2002-372988 | 12/2002 |
| JP | 2005-92310 | 4/2005 |
| JP | 2005-196047 | 7/2005 |
| JP | 2005-234236 | 9/2005 |
| JP | 3724649 | 9/2005 |
| JP | 2006-154658 | 6/2006 |
| JP | 3888543 | 12/2006 |
| JP | 2007-4052 | 1/2007 |
| WO | 02/07146 A1 | 1/2002 |

OTHER PUBLICATIONS

Japanese Office Action dated May 22, 2012 issued in corresponding Japanese Patent Application No. 2008-180515.

* cited by examiner

FIG. 2A

| READING | PHONEMIC STRING |
|---------|-----------------|
| ⋮ | ⋮ |
| OKINAKA | / okinaka / |
| OKINAWA | / okinawa / |
| ⋮ | ⋮ |

FIG. 2B

```
okina.wav,      OKINA
okinawa.wav,    OKINAWA
okinaa.wav,     OKINAA
```

FIG. 4

| RECOGNITION WORD | | REJECT WORD | |
|---|---|---|---|
| READING | PHONEMIC STRING | READING | PHONEMIC STRING |
| ⋮ | ⋮ | ⋮ | ⋮ |
| OKINAKA | / okinaka / | OKINAA | / okinaa / |
| OKINAWA | / okinawa / | | |
| ⋮ | ⋮ | ⋮ | ⋮ |

FIG. 8 nokinaka.wav,   NOKINAKA
okinaa.wav,     OKINAA

VOICE RECOGNITION APPARATUS, VOICE RECOGNITION METHOD AND RECORDING MEDIUM

CROSS-REFERENCE TO RELATED APPLICATIONS

This application is based upon and claims the benefit of priority of the prior Japanese Patent Application No. 2008-180515, filed on Jul. 10, 2008, the entire contents of which are incorporated herein by reference.

FIELD

The embodiments discussed herein are related to a voice recognition apparatus which, based upon a degree of similarity between a voice signal and any one of recognition words preliminarily registered, determines whether or not the voice signal corresponds to the recognition word, and outputs the result of recognition, a voice recognition method using such a voice recognition apparatus, and a recording medium on which a computer program for realizing the voice recognition apparatus by the use of a computer is recorded.

BACKGROUND

As a conventional voice recognition apparatus, an apparatus that is preliminarily provided with a word dictionary having information of recognition words registered therein and a reject word dictionary having information of reject words registered therein has been known (for example, see Japanese Laid-open Patent Publication No. 2001-147698 and Japanese Patent No. 3105863). This voice recognition apparatus compares voice information, inputted by a speaker, and information registered in the word dictionary and the reject word dictionary with each other, and specifies a word that is most similar to the inputted voice information. Moreover, when the specified word is a recognition word, the voice recognition apparatus outputs the recognition word as the result of recognition, while, when the specified word is a reject word, the inputted voice information is rejected as being unable to obtain the result of recognition.

In the structure using the above-mentioned reject word dictionary, with respect to such voice information as to form the first place in the degree of similarity to a reject word, the corresponding information is rejected whatever word dictionary may be used. For this reason, an arrangement is sometimes made so that a reject word that might give adverse effects to the result of recognition is not registered in the reject word dictionary.

More specifically, for example, suppose that an attempt is made to desirably obtain "OKINAWA" as the result of recognition of inputted voice information. Here, suppose that, upon representing a degree of similarity to inputted information by using marks with the full marks being set to 100 points, the degree of similarity of 98 points is given to "OKINAA", that of 95 points is given to "OKINAKA" and that of 93 points is given to "OKINAWA", with respect to the respective inputted pieces of voice information.

Here, suppose that pieces of information, "OKINAKA" and "OKINAWA", are registered in a word dictionary and that information, "OKINAA", is registered in a reject word dictionary. In this case, since the information "OKINAA" having the highest degree of similarity is registered in the reject word dictionary, the inputted voice signal is rejected, as being unable to obtain the result of recognition.

In contrast, suppose that, although pieces of information "OKINAKA" and "OKINAWA" are registered in a word dictionary, information, "OKINAA", is not registered in a reject word dictionary. In this case, since the information "OKINAA" having the highest degree of similarity is not registered in any of the word dictionary and the reject word dictionary, but the information "OKINAKA" having the second highest degree of similarity is registered in the word dictionary, "OKINAKA" is outputted as the result of recognition.

As described above, with respect to such voice information as to be recognized as "OKINAA", "OKINAKA" and "OKINAWA" in the descending order of the degree of similarity, it is not possible to obtain an appropriate result of recognition, "OKINAWA", in none of the cases in which "OKINAA" is registered as a reject word and in which this is not registered as a rejected word.

Here, another device has been proposed in which a weight to be applied to a likelihood ratio (degree of similarity) of an unknown word model is determined for each of recognition words, and by comparing the likelihood ratio of the weighted unknown word model and the result of recognition, it is determined whether the result of recognition is adopted or rejected (for example, see Japanese Laid-open Patent Publication No. 10-171488). Moreover, still another apparatus has been proposed in which an appropriate reject word is generated in accordance with a feature of each of recognition words registered in a word dictionary so that the reject word is registered in a reject word dictionary (for example, see Japanese Laid-open Patent Publication No. 2006-154658).

SUMMARY

According to an aspect of the invention, a voice recognition apparatus includes a word dictionary for storing a plurality of recognition words, extracts a feature amount from a voice signal, and calculates a degree of similarity between the voice signal and each of recognition words stored in the word dictionary by using the extracted feature amount, and outputs a recognition word having a high calculated degree of similarity as a result of recognition. In the voice recognition apparatus disclosed in the present application, the word dictionary includes a structure that stores a reject word that specifies whether or not the recognition word is preferably excluded from the result of recognition, in association with the recognition word, and a degree of similarity is calculated between the voice signal and each of the recognition words and reject words stored in the word dictionary by using the extracted feature amount. Moreover, the voice recognition apparatus determines whether or not a word having a high calculated degree of similarity corresponds to a reject word, and upon determining that the word corresponds to a reject word, excludes the recognition word stored in the word dictionary in association with the reject word from the result of recognition. Here, in the case where a word having a high calculated degree of similarity is a recognition word, the voice recognition apparatus outputs this recognition word as the result of recognition.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF THE DRAWINGS

FIGS. 2A and 2B are schematic diagrams that depict examples of structures of a word dictionary and voice data with its reading;

FIG. 4 is a schematic diagram that depicts an example of a structure of a word dictionary in which reject words have been registered;

FIG. 8 is a schematic diagram that depicts an example of a structure of voice data with its reading in accordance with a second embodiment;

DETAILED DESCRIPTION

Referring to drawings depicting the respective embodiments, the following description will discuss a voice recognition apparatus, a voice recognition method and a computer program that are disclosed in the present application. Here, the respective embodiments describe a structure in which the computer program to be disclosed in the present application is read by a known personal computer or the like, and executed by a CPU (Central Processing Unit) or the like of the personal computer so that a voice recognition apparatus to be disclosed by the present application is realized. However, the voice recognition apparatus to be disclosed in the present application may be realized by using hardware that carries out equivalent operations.

First Embodiment

Figure 1:
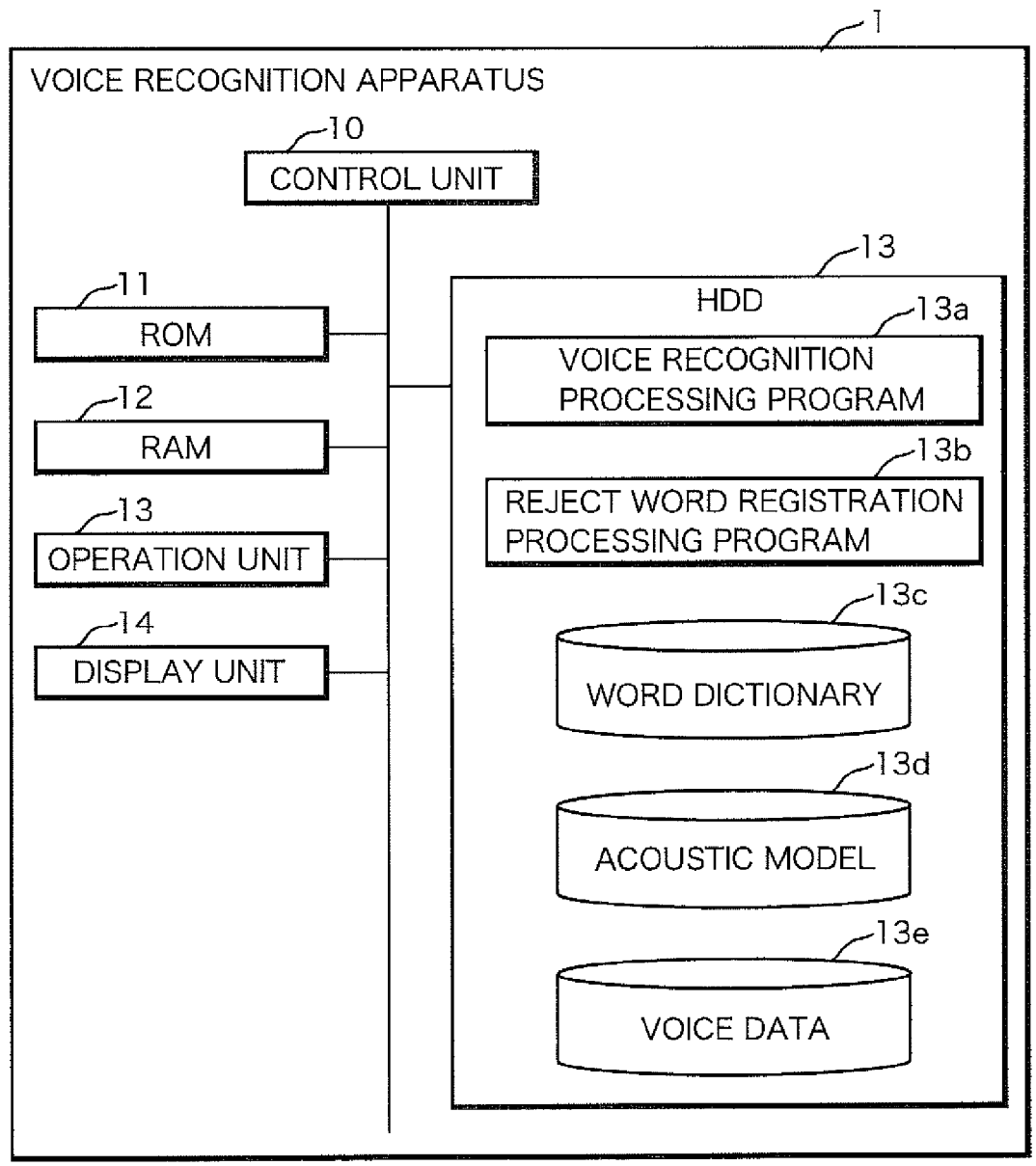
FIG. 1 is a block diagram that depicts an example of a structure of a voice recognition apparatus in accordance with a first embodiment.

Referring to drawings illustrating a first embodiment, the following description will discuss the voice recognition apparatus to be disclosed in the present application. FIG. 1 is a block diagram that depicts an example of a structure of the voice recognition apparatus of the first embodiment. A voice recognition apparatus 1 of the first embodiment is provided, for example, as a known personal computer including a control unit 10, a ROM (Read Only Memory) 11, a RAM (Random Access Memory) 12, a hard disc driver (hereinafter, referred to as a "HDD") 13, an operation unit 14 and a display unit 15, and these hardware parts may be mutually connected to one another through a bus 1a.

The control unit 10, such as a CPU, an MPU (Micro Processor Unit) or the like, reads out a control program preliminarily stored in the ROM 11 or HDD 13 onto the RAM 12 on demand, and executes the program, and also controls the operations of the respective hardware parts. The ROM 11 preliminarily stores various control programs that are required for operating the voice recognition apparatus 1 as the voice recognition apparatus of the present invention. The RAM 12, which is a SRAM, a flash memory or the like, temporarily stores various data that are generated upon executing the control program by using the control unit 10.

The HDD 13, which is a large capacity storage device, preliminarily stores various control programs required for operating the voice recognition apparatus 1 as the voice recognition apparatus of the present application, screen information used for notifying various pieces of information to the user, and the like. Moreover, the HDD 13 stores a voice recognition processing program 13a, a reject word registration processing program 13b, a word dictionary 13c as depicted in FIG. 2A, an acoustic model 13d, voice data 13e with a reading function, as depicted in FIG. 2B, and the like, as various pieces of information that allow operations as the voice recognition apparatus disclosed in the present application.

FIGS. 2A and 2B are schematic diagrams that depict examples of structures of a word dictionary 13c and voice data 13e with a reading function. As depicted in FIG. 2A, in the word dictionary 13c, with respect to each of recognition words serving as the results of recognition in a voice recognition process carried out by the voice recognition apparatus 1, a reading and a phoneme string are registered in association therewith. Here, the phoneme string of each recognition word represents an alignment of acoustic models that exhibits a characteristic of each phoneme, with respect to phonemes contained in each recognition word.

The voice data 13e with a reading function includes a plurality of voice data files (not depicted) in which a plurality of voice data (voice signals) have been stored, and a text file that describes a file name of a voice data file for each word and a reading of each word in association with each other, for each of a plurality of words that form reject word candidates relative to a recognition word to which a reject word is to be added. FIG. 2B depicts an example of the contents of descriptions of the text file.

Here, the voice data file is formed as follows: a voice that vocalizes each of the words forming the reject word candidates is acquired and digital voice data (voice signals), obtained by converting the acquired analog voice data (voice signals) into digital voice data (voice signals) through an analog/digital converting process, are stored. Moreover, about 100 pieces (100 vocalizations) of voice data are stored in each voice data file, for each of the words forming the reject word candidates.

Moreover, although the contents of the acoustic model 13d are not illustrated in the drawings, the acoustic model 13d stores an acoustic model (feature pattern) representing the feature of each phoneme for each Japanese phoneme. Here, the acoustic model may be formed by utilizing parameters commonly used in the field of voice recognition, for example, MFCC (Mel Frequency Cepstrum Coefficient) parameters, and the like.

The structure of each piece of information to be stored in the HDD 13 is not necessarily limited to a structure preliminarily stored in the HDD 13. In the case where the voice recognition apparatus 1 is provided with a driver (not depicted) capable of reading data stored in an external memory (not depicted), various kinds of information stored in the external memory may be read out by the driver and stored in the HDD 13. Moreover, in the case where the voice recognition apparatus 1 is provided with a communication unit (not depicted) that can be connected to a network such as the Internet, various kinds of information may be downloaded from an external device through the network, and stored in the HDD 13.

The operation unit 14 is configured by a keyboard, a mouse and the like, and provided with various kinds of operation keys that allow the user to operate the voice recognition apparatus 1. Upon operation of any of the keys by the user, the operation unit 14 releases control signals corresponding to the operation keys that have been operated to the control unit 10 so that the control unit 10 executes processes corresponding to the control signals acquired by the operation unit 14.

The display unit 15 includes a liquid crystal display, a CRT display or the like, and in accordance with instructions from the control unit 10, displays an operation state of the voice recognition apparatus 1, information inputted through the operation unit 14, information of which the user is notified, and the like.

Here, the voice recognition apparatus 1 of the first embodiment may be provided with, for example, a voice input unit having a microphone, an analog/digital converter, etc., a digital/analog converter, a voice output unit having a voice amplification circuit, a speaker, etc.

Figure 3:
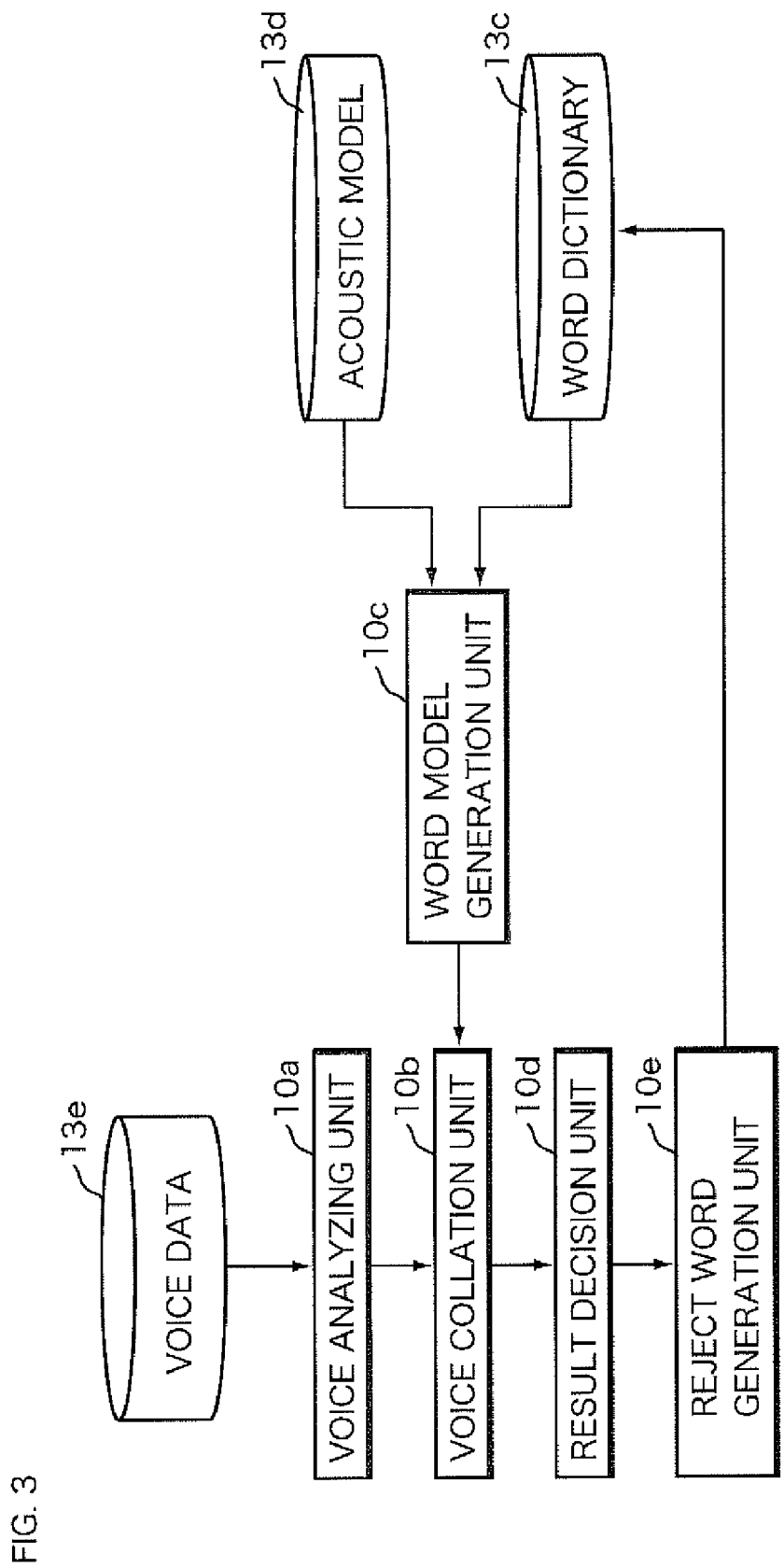
FIG. 3 is a functional block diagram that depicts an example of a functional structure of the voice recognition apparatus of the first embodiment.

The following description will discuss various kinds of functions that are realized when the control unit 10 executes a control program stored in the ROM 11 or the HDD 13 in the voice recognition apparatus 1 having the above-mentioned structure. FIG. 3 is a functional block diagram that depicts an example of a functional structure of the voice recognition apparatus 1 of the first embodiment.

In the voice recognition apparatus 1 of the present first embodiment, upon request by the user for executing a reject word registering process through the operation unit 14, the control unit 10 executes a voice recognition processing program 13a and a reject word register processing program 13b stored in the HDD 13. Thus, the control unit 10 realizes various functions of a voice analyzing unit 10a, a voice collation unit 10b, a word model generation unit 10c, a result decision unit 10d, a reject word generation unit 10e and the like.

When the voice recognition apparatus 1 executes the voice recognition process, the control unit 10 executes the respective functions of the voice analyzing unit 10a, the voice collation unit 10b, the word model generation unit 10c, the result decision unit 10d. Here, the voice recognition apparatus 1 has a function for registering (adding) a reject word in association with each of recognition words registered in the word dictionary 13c.

Here, the reject word is a word for specifying whether or not a corresponding recognition word is preferably excluded from the result of recognition, and when as the result of voice recognition, a reject word is obtained, the recognition word, registered in the word dictionary 13c in association with this reject word, is excluded from the result of recognition. When the voice recognition apparatus 1 executes a registering process for a reject word, the control unit 10 executes the respective functions of the voice analyzing unit 10a, the voice collation unit 10b, the word model generation unit 10c, the result decision unit 10d and the reject word generation unit 10e.

The voice analyzing unit (extraction unit) 10a acoustically analyzes voice data, and extracts, for example, MFCC parameters (feature parameters, amount of feature) from the voice data. Here, the feature parameters to be extracted by the voice data are not limited to the MFCC parameters, as long as they are parameters indicating the feature of the voice data.

The word model generation unit 10c generates a word model (acoustic parameter) of each of the recognition words, based upon a phonemic string of each of the recognition words and the acoustic model registered in the acoustic model 13d, with respect to each of the recognition words registered in the word dictionary 13c. Here, the word model generation unit 10c generates a word model, for example, expressed using a Hidden Markov Model (HMM).

The voice collation unit (collation unit) 10b collates the feature parameter of the voice data extracted by the voice analyzing unit 10a with each of the word models of the recognition words generated by the word model generation unit 10c so that a likelihood ratio indicating the degree of similarity of the two is calculated. Here, the likelihood ratio indicates the possibility of a feature parameter of voice data corresponding to a word model of the recognition words. The voice collation unit 10b transmits the likelihood ratio calculated for each of the word models generated by the word model generation unit 10c to the result decision unit 10d.

The result decision unit (collation unit) 10d determines a word model having the highest likelihood ratio based upon the likelihood ratio relating to each of the word models acquired from the voice collation unit 10b, and outputs the recognition word from which the determined word model is obtained, as the result of recognition. Here, when the voice recognition apparatus 1 of the present the first embodiment carries out a voice recognition process, the result decision unit 10d transmits the obtained result of recognition to a given output destination. Moreover, when the voice recognition apparatus 1 of first embodiment carries out a registering process of a reject word relating to a recognition word registered in the word dictionary 13c, the result decision unit 10d transmits the obtained result of recognition to the reject word generation unit 10e.

Based upon the result of recognition obtained from the result decision unit 10d, the reject word generation unit 10e registers the reject word in association with the recognition word registered in the word dictionary 13c. Here, specific processes to be carried out by the reject word generation unit 10e will be described later.

In the case where the voice recognition apparatus 1 including the above-mentioned structure executes a recognition process for voice data, the voice analyzing unit 10a extracts a feature parameter from voice data inputted from, for example, an external unit, and transmits the extracted feature parameter to the voice collation unit 10b. The voice collation unit 10b collates the feature parameter acquired from the voice analyzing unit 10a with a word model of each of the recognition words generated by the word model generation unit 10c, and calculates the likelihood ratio representing the degree of similarity of the two. The voice collation unit 10b sends the likelihood ratio thus calculated on the word model of each of the recognition words to the result decision unit 10d so that the result decision unit 10d determines the recognition word having the acquired word model with the highest likelihood ratio as the result of recognition.

The following description will discuss processes to be carried out upon registering a reject word relating to a recognition word registered in the word dictionary 13c in the voice recognition apparatus 1 having the above-mentioned structure. Here, in an attempt to register a reject word relating to any one of the recognition words registered in the word dictionary 13c, the user prepares text data depicted in FIG. 2B and a voice data file whose file name is described in this text data, as learning data for use in specifying the reject word. Then, the user specifies the recognition word on which the reject word is desirably registered and the text data as subjects to be processed, and allows the voice recognition apparatus 1 to execute the reject word registering process.

In this case, the following description will exemplify processes in which pieces of information, "OKINAKA" and "OKINAWA", have been registered in the word dictionary 13c as recognition words, and by using the respective words, "OKINA", "OKINAWA" and "OKINAA", as reject word candidates, and any one of these is registered as a reject word relating to the recognition word "OKINAKA".

The voice analyzing unit 10a reads information (file name and reading of a voice data file) of one of reject word candidates from text data depicted in FIG. 2B of voice data 13e with its reading. For example, the voice analyzing unit 10a reads a file name "okina.wav" and reading "OKINA". The voice analyzing unit 10a reads voice data of 100 vocalizations (100 pieces) stored in the voice data file of a voice file name "okina.wav". The voice analyzing unit 10a extracts a feature parameter from each piece of voice data, and sends the extracted feature parameter to the voice collation unit 10b.

The voice collation unit 10b collates each of the feature parameters successively sent from the voice analyzing unit 10a with word models of the respective recognition words generated from the word model generation unit 10c, and calculates the likelihood ratio representing the degree of similarity of the two. With respect to each of the feature parameters successively sent from the voice analyzing unit 10a, the voice collation unit 10b sends the calculated likelihood ratio relative to the word models of the respective recognition words to the result decision unit 10d. The result decision unit 10d determines the word model having the highest likelihood ratio for each of the feature parameters of the respective voice signals so that the recognition word from which the determined word model is obtained is given as the result of recognition, and sends the result of recognition of each of the feature parameters to the reject word generation unit 10e.

The voice analyzing unit 10a, the voice collation unit 10b and the result decision unit 10d repeat the above-mentioned processes on all the voice data files whose file names are described in the text data, as well as on all the voice data stored in the respective voice data files.

Based upon the results of recognition of each of the feature parameters acquired from the result decision unit 10d, the reject word generation unit (calculation unit) 10e calculates the number of vocalizations from which the recognition word on which the reject word is to be registered is obtained as the result of recognition, for each of the reject word candidates. That is, the reject word generation unit 10e calculates the number of vocalizations that are recognized as the recognition word "OKINAKA" with respect to voice data corresponding to the 100 vocalizations that are voice data of the respective reject word candidates. The reject word generation unit (registering unit) 10e registers the reject word candidate having the most number of vocalizations recognized as the recognition word "OKINAKA" on which the reject word is desirably registered, in the word dictionary 13c as a reject word relating to the recognition word "OKINAKA".

For example, in the case where the reject word registering process is carried out on text data depicted in FIG. 2B as a subject to be processed, suppose that, as the result of recognition of voice data corresponding to 100 vocalizations to be recognized as "OKINA", 10 vocalizations are recognized as "OKINAKA", that, as the result of recognition of voice data corresponding to 100 vocalizations to be recognized as "OKINAWA", 0 vocalization is recognized as "OKINAKA", and that, as the result of recognition of voice data corresponding to 100 vocalizations to be recognized as "OKINAA", 30 vocalizations are recognized as "OKINAKA". In this case, the reject word generation unit 10e registers "OKINAA" that has the most number of vocalizations that are recognized as "OKINAKA" in the word dictionary 13c as the reject word relating to the recognition word "OKINAKA".

Consequently, since the word having a higher possibility of being recognized as "OKINAKA", which is not desired to be obtained as the result of recognition, is registered as a reject word relating to the recognition word "OKINAKA", it is possible to prevent erroneous recognition with high precision.

By using the above-mentioned processes, the reject word generation unit 10e is allowed to generate a word dictionary 13c as depicted in FIG. 4, from the word dictionary 13c depicted in FIG. 2A. Here, the word dictionary 13c depicted in FIG. 4 may be formed by adding reject words to the word dictionary 13c depicted in FIG. 2A, or may be formed as a new word dictionary 13c.

FIG. 4 is a schematic diagram that depicts an example of a structure of the word dictionary 13c in which reject words are registered. The word dictionary 13c depicted in FIG. 4 has a reading and phoneme string of each of recognition words that are the results of the voice recognition process carried out by the voice recognition apparatus 1 and a reading and phoneme string of each of the reject words added (registered) to the respective recognition words, which are registered therein in association with each other.

When the voice recognition apparatus 1 carries out a recognition process for voice data by using the word dictionary 13c in which the reject words have been registered (added) as described above, the word model generation unit 10c generates a word model not only for each of the recognition words, but also for each of the reject words registered in the word dictionary 13c. That is, based upon the acoustic models registered in the acoustic model 13d and the respective phoneme strings of both the recognition words, the word model generation unit 10c generates a word model for each of the recognition words and the reject words.

The voice analyzing unit 10a extracts a feature parameter from inputted voice data, and transmits the extracted feature parameter to the voice collation unit 10b. The voice collation unit 10b collates the feature parameter acquired from the voice analyzing unit 10a using word models of each of the recognition words and the reject words, generated by the word model generation unit 10c, and calculates the likelihood ratio representing the degree of similarity of the two. The voice collation unit 10b sends the likelihood ratio thus calculated on the word model of each of the recognition words and the reject words to the result decision unit 10d.

The result decision unit 10d specifies the acquired word model with the highest likelihood ratio, and determines whether the corresponding word model corresponds to a recognition word or a reject word. In the case where the result decision unit 10d has determined that the acquired word model having the highest likelihood ratio corresponds to a recognition word, it uses this recognition word as the result of recognition. In contrast, in the case where the result decision unit 10d has determined that the acquired word model having the highest likelihood ratio corresponds to a reject word, it does not use this reject word and the recognition word registered in the word dictionary 13c in association with the reject word as the result of recognition. Consequently, the result decision unit 10d specifies a word model having the next highest likelihood ratio, and carries out the same processes on this word model.

Even in the case where, in these processes, the word having the highest likelihood ratio is a reject word and the word having the next highest likelihood ratio is a recognition word that is not desired to be obtained as the recognition result, with the word having the third highest likelihood ratio being a recognition word that is desired to be obtained as the recognition result, the recognition word that is desired to be obtained as the recognition result is consequently obtained as the result of recognition. More specifically, by registering the reject word having the highest likelihood ratio as a reject word for a recognition word that is not desired to be obtained as the result of recognition, it becomes possible to exclude the recognition word that is not desired to be obtained as the result of recognition from the result of recognition, and consequently to obtain as the result of recognition a recognition word that is desired to be obtained as the result of recognition.

Therefore, in the case where it is highly possible that a word (similar word) similar to a recognition word that is desired to be obtained as the result of recognition might be recognized as a recognition word that is not desired to be obtained as the result of recognition, this similar word is registered as a reject word relating to the recognition word that is not desired to be obtained as the result of recognition. Thus, even in the case where, as a result of a voice recognition of the voice data of the similar word, the corresponding word is recognized as a word similar to a recognition word that is desired to be obtained as the result of recognition, since the word is a reject word, the recognition word in association with this reject word is not used as the result of recognition, thereby making it possible to prevent erroneous recognition.

Figure 5:
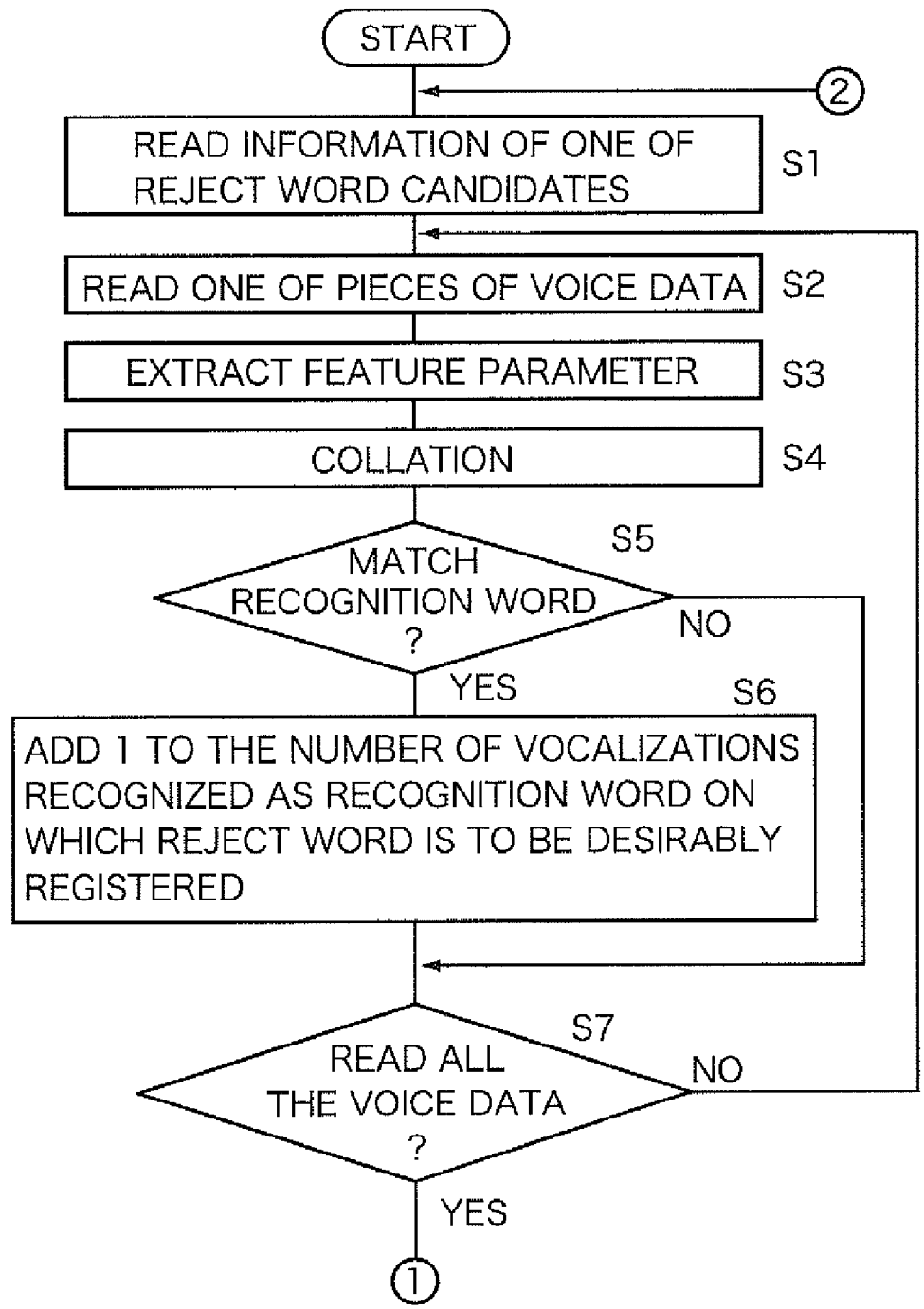
FIG. 5 is an operation chart that depicts an example of a sequence of reject word registering processes.
Figure 6:
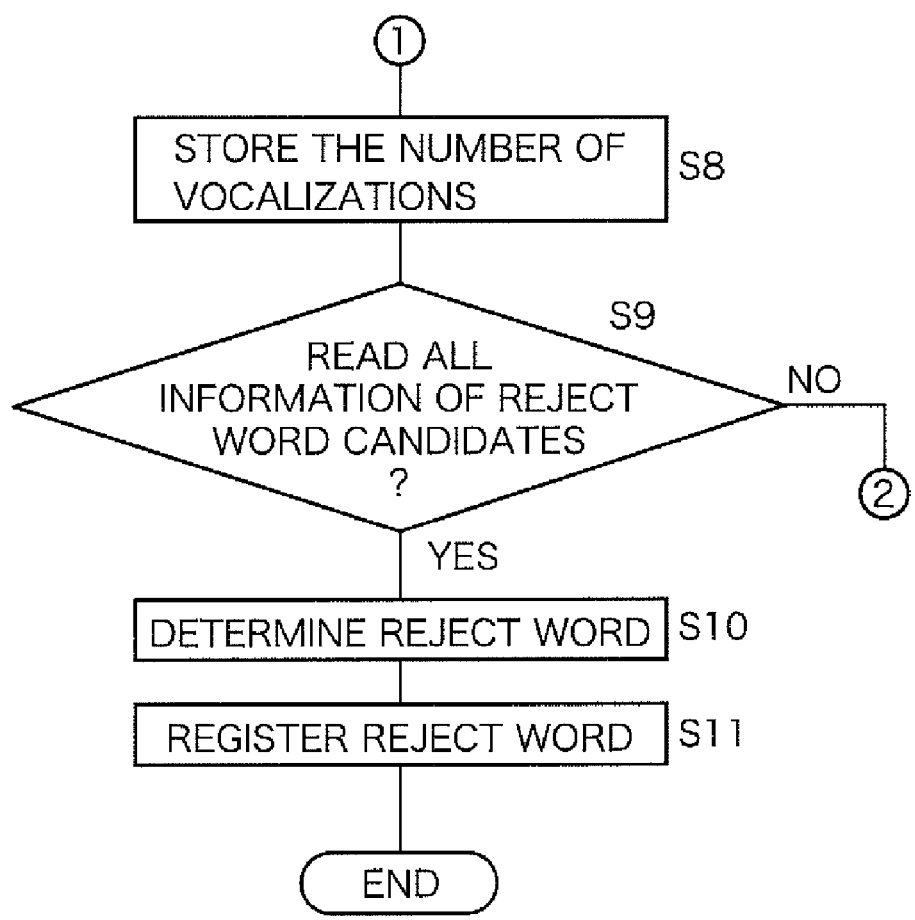
FIG. 6 is another operation chart that depicts an example of a sequence of reject word registering processes.

Next, referring to an operation chart, the following description will discuss a reject word registering process by the voice recognition apparatus 1 of the present first embodiment in detail. FIG. 5 and FIG. 6 are operation charts that depict a sequence of the reject word registering processes. Here, the following processes are executed by the control unit 10 in accordance with a control program stored in the ROM 11 or the HDD 13 in the voice recognition apparatus 1.

In an attempt to register a reject word relating to any one of the recognition words registered in the word dictionary 13c, the user prepares text data depicted in FIG. 2B and a voice data file whose file name is described in this text data. Then, the user specifies the recognition word on which the reject word is desirably registered and the text data as subjects to be processed, and allows the voice recognition apparatus 1 to execute the reject word registering process.

The control unit 10 (voice analyzing unit 10a) reads information (file name and reading of a voice data file) of one of reject word candidates from the text data (at S1). The control unit 10 (voice analyzing unit 10a) reads one of pieces of voice data stored in the voice data file having the read-out file name (at S2), and extracts a feature parameter from the read-out voice data (at S3).

The control unit 10 (voice collation unit 10b) collates the extracted feature parameter with word models of the respective recognition words generated from the word model generation unit 10c (at S4). Based upon the likelihood ratio between the feature parameter extracted from the voice data and the word models of the respective recognition words, the control unit 10 (voice collation unit 10b) uses the recognition word corresponding to the word model having the highest likelihood ratio as the result of recognition. The control unit 10 (result decision unit 10d) determines whether or not the result of recognition matches the recognition word on which the reject word is to be desirably registered (at S5).

Upon determining that the result of recognition matches the recognition word on which the reject word is desirably registered (at S5: YES), the control unit 10 (result decision unit 10d) adds 1 to the number of vocalizations recognized as the recognition word on which the reject word is to be desirably registered (at S6). Here, the number of vocalizations recognized as the recognition word on which the reject word is to be desirably registered is reset to 0 at the start time of the reject word registering process.

Upon determining that the result of recognition does not match the recognition word on which the reject word is to be desirably registered (at S5: NO), the control unit 10 skips the process of operation S6. The control unit 10 determines whether or not all the voice data stored in the voice data file having the file name read out in operation S1 have been read (at S7), and upon determining that those voice data have not been read out (at S7: NO), the process is returned to operation S2. The control unit 10 carries out the above-mentioned processes of operations S3 to S6 on all the voice data stored in the voice data file having the file name read out in operation S1.

Upon determining that all the voice data stored in the voice data file having the file name read out in operation S1 have been read out (at S7: YES), the control unit 10 allows the RAM 12 to store the number of vocalizations calculated in operation S6 in association with the reading read out in operation S1 (at S8).

The control unit 10 determines whether or not all the information of the reject word candidates described in the text data to be processed (at S9) has been read out, and upon determining that all the information of the reject word candidates has not been read out (at S9: NO), the process is returned to operation S1. The control unit 10 reads out one of the pieces of information of the reject word candidates that have not been processed from the text data to be processed (at S1), and repeats the above-mentioned processes of operations S2 to S8 based upon the read-out information.

Upon determining that all the information of the reject word candidates has been read out (at S9: YES), the control unit 10 determines a reject word based upon the number of vocalizations recognized as the recognition word on which the reject word is to be desirably registered (at S10), stored in the RAM 12 in operation S8. More specifically, the control unit 10 determines the word having the most number of vocalizations recognized as the recognition word on which the reject word is to be desirably registered as a reject word. The control unit 10 registers the reject word thus determined in the word dictionary 13c in association with the recognition word on which the reject word is desirably registered (at S11).

Figure 7:
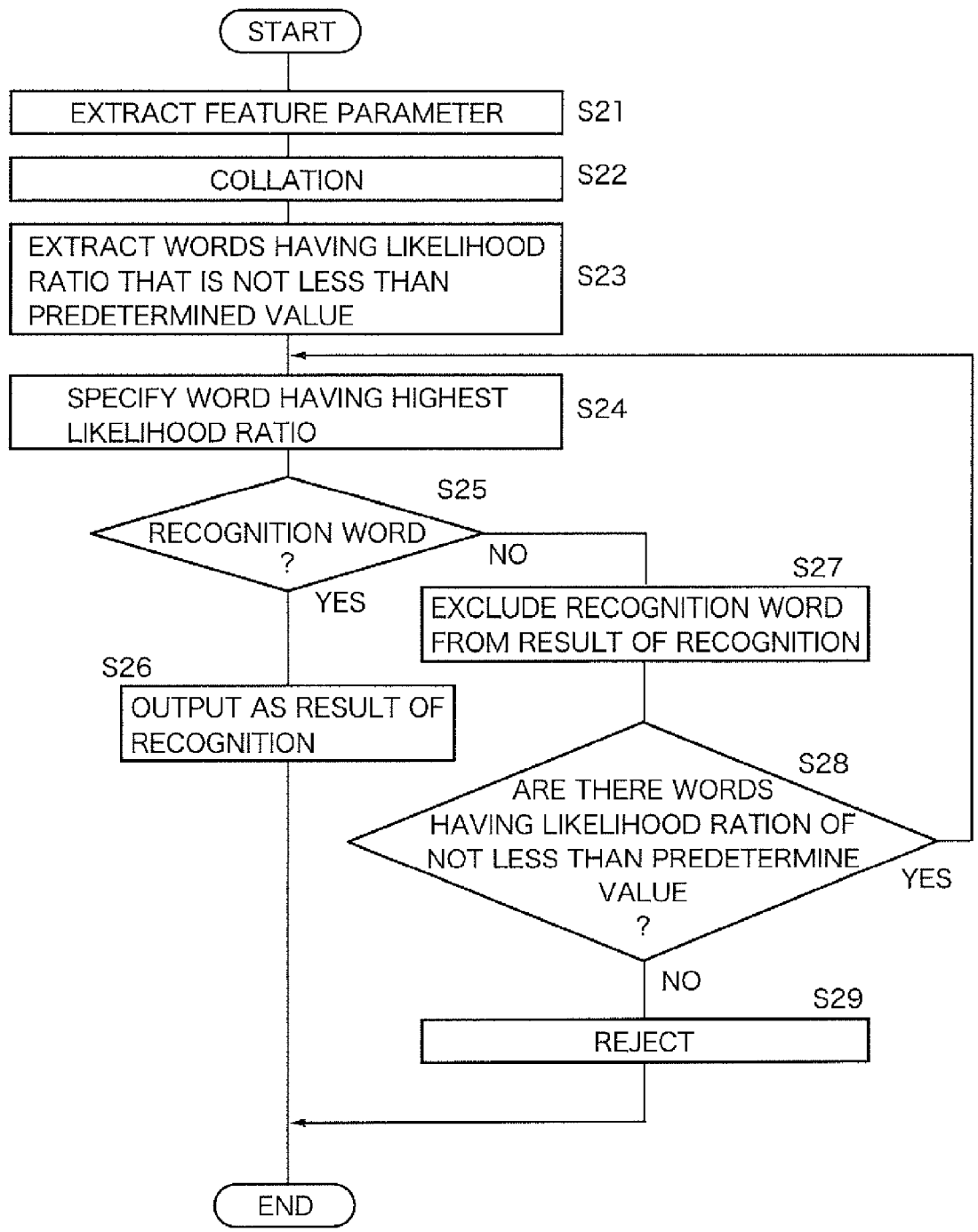
FIG. 7 is an operation chart that depicts an example of a sequence of voice recognizing processes.

Next, referring to an operation chart, the following description will discuss a voice recognition process by the use of the word dictionary 13c in which the reject words have been registered as described above, in detail. FIG. 7 is an operation chart that depicts an example of a sequence of the voice recognition processes. Here, the following processes are executed by the control unit 10 in accordance with a control program stored in the ROM 11 or the HDD 13 of the voice recognition apparatus 1.

The control unit 10 (voice analyzing unit 10a) extracts a feature parameter from voice data that is subjected to the voice recognition process (at S21). The control unit 10 (voice collation unit 10b) collates the feature parameter thus extracted with a word model of each of the recognition words and reject words generated by the word model generation unit 10c (at S22). Here, upon carrying out the voice recognition, the control unit 10 (word model generation unit 10c) preliminarily generates a word model, not only for each of the recognition words, but also for each of the reject words registered in the word dictionary 13c.

The control unit 10 (voice collation unit 10b) calculates the likelihood ratio between the feature parameter extracted from the voice data and each of the word models of the recognition words and reject words. The control unit 10 (result decision unit 10d) extracts words having a calculated likelihood ratio that is not less than a given value (at S23). Among the extracted words, the control unit 10 (result decision unit 10d) specifies a word having the highest likelihood ratio (at S24), and determines whether or not the specified word is a recognition word (at S25).

Upon determining that the specified word is a recognition word (at S25: YES), the control unit 10 (result decision unit 10d) outputs the specified word (recognition word) as the result of recognition (at S26), thereby completing the voice recognition process. Upon determining that the specified word is not a recognition word (at S25: NO), that is, that the specified word is a reject word, the control unit 10 (result decision unit 10d) excludes the recognition word registered in the word dictionary 13c in association with the specified word (reject word) from the result of recognition (at S27).

The control unit 10 determines whether or not there are still any words having a likelihood ratio of not less than a given value that have been extracted in operation S23 (at S28), and upon determination that there are still some (at S28: YES), the process is returned to operation S24. The control unit 10 excludes those words that have been subjected to processes in operations S25 to S27 from the words extracted in operation S23, and then specifies a word having the highest likelihood ratio among the rest of the words (at S24). The control unit 10 carries out the above-mentioned processes in operations S25 to S27 on the word thus specified.

Upon determination that there are no longer any words having a likelihood ratio of not less than a given value that have been extracted in operation S23 (at S28: NO), the control unit 10 rejects the voice data that is to be subjected to the voice recognition (at S29), and completes the voice recognition process without outputting the result of recognition.

As described above, in the voice recognition apparatus 1 of the present the first embodiment, reject words are registered for each of recognition words registered in the word dictionary 13c. Therefore, in the case where voice data to be subjected to the voice recognition process is recognized as a word (reject word) that is similar to the recognition word that is not desired to be obtained as the result of recognition, the recognition word relating to this reject word is excluded from the result of recognition. Thus, it becomes possible to prevent erroneous recognition, and consequently to improve the precision of the voice recognition.

The voice recognition apparatus 1 of the above-mentioned the first embodiment has a structure in which, upon registering a reject word on a recognition word, a voice recognition process is carried out on voice data of each of reject word candidates, and the reject word candidate having the most number of vocalizations that have been recognized as the recognition word is registered as the reject word. Not limited to this structure, the voice recognition apparatus 1 may have another structure in which a voice recognition process is carried out on voice data of each of reject word candidates so that all of those reject word candidates having a given number or more of vocalizations that have been recognized as the recognition word are registered as the reject words.

In the case where all of those reject word candidates having a given number or more of vocalizations that have been recognized as the recognition word on which the reject word is desired to be registered are registered as the reject words, since those recognition words that are not desired to be obtained as the result of recognition can be excluded from the result of recognition more positively, it becomes possible to reduce the possibility of erroneous recognition.

Moreover, the voice recognition apparatus 1 may have still another structure in which, for example, a voice recognition process is carried out on voice data of each of reject word candidates, and in the case where the ratio of the number of vocalizations that have been recognized as the recognition word on which the reject word is desired to be registered to the number of all the vocalizations becomes a given value or more, the corresponding reject word candidates are registered as reject words.

The voice recognition apparatus 1 including the above-mentioned structure may be effectively used for vocalizations that have, for example, a different word length, with one portion of the vocalization being similar, with the result that an erroneous recognition is caused. For example, suppose that, as a result of recognition for voice data having a vocalization of "AITIKEN", the number of vocalizations recognized as the recognition word "ITI" is 50, that, as a result of recognition for voice data having a vocalization of "YOKKAICHI", the number of vocalizations recognized as the recognition word "ITI" is 80, and that, as a result of recognition for voice data having a vocalization of "ITIDUKERU", the number of vocalizations recognized as the recognition word "ITI" is 60.

In this case, the reject word generation unit 10e registers "YOKKAITI" having the largest number of vocalizations that are recognized as the recognition word "ITI" in the word dictionary 13c as a reject word relating to "ITI". Here, when the reject word generation unit 10e has a structure in which all the reject word candidates having the number of vocalizations recognized as the recognition word "ITI" that exceeds a given number (for example, 50) are registered as the reject words, all the "AITIKEN", "YOKKAITI" and "ITIDUKERU" are registered in the word dictionary 13c as reject words relating to the recognition word "ITI".

Second Embodiment

The following description will discuss a voice recognition apparatus in accordance with a second embodiment. Here, since the voice recognition apparatus of the second embodiment can be realized by using the substantially same structure as that of the voice recognition apparatus 1 depicted in FIG. 1 described in the first embodiment, the same structures are indicated by the same reference numerals, and the description thereof is not given.

The above-mentioned voice recognition apparatus 1 of the first embodiment has the structure in which voice data of a plurality of reject word candidates is subjected to a voice recognition process with respect to a recognition word on which a reject word is desirably added, and as a result, a word having many vocalizations that are recognized as the recognition word to which a reject word is desirably added is determined as the reject word. In the voice recognition apparatus 1 of the present second embodiment, voice data of a plurality of reject word candidates relating to a recognition word to which a reject word is added is subjected to a voice recognition process, and as a result, the phoneme string of the reject word candidate having the highest likelihood ratio (maximum likelihood phoneme string) is registered in the word dictionary 13c as a reject word.

In the voice recognition apparatus 1 of the present second embodiment, in the same manner as in the control unit 10 of the aforementioned first embodiment, the control unit 10 realizes various functions of a voice analyzing unit 10a, a voice collation unit 10b, a word model generation unit 10c, a result decision unit 10d, a reject word generation unit 10e and the like. Here, when the voice recognition apparatus 1 of the second embodiment executes the voice recognition process, the control unit 10 executes the same processes as those of the voice recognition apparatus 1 of the aforementioned first embodiment. Moreover, when the voice recognition apparatus 1 of the second embodiment carries out a reject word registering process, the voice analyzing unit 10a carries out the same processes as those of the voice analyzing unit 10a of the aforementioned first embodiment.

Figure 8:
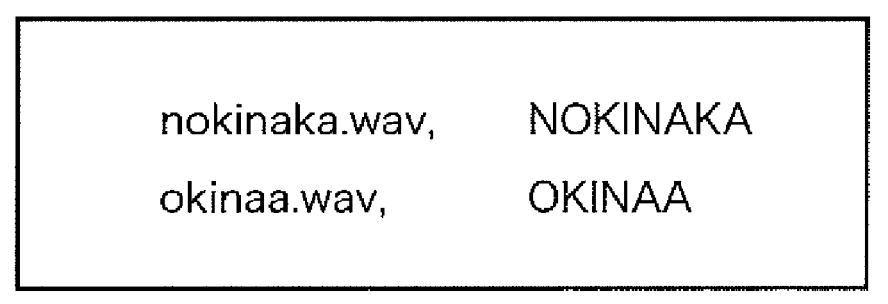

FIG. 8 is a schematic diagram that depicts an example of a structure of voice data with its reading of the second embodiment. When the voice recognition apparatus 1 of the present second embodiment registers a reject word relating to any one of the recognition words registered in the word dictionary 13c, the user prepares text data depicted in FIG. 8 and a voice data file whose file name is described in this text data. Then, the user specifies the recognition word on which the reject word is desirably registered and the text data as subjects to be processed, and allows the voice recognition apparatus 1 to execute the reject word registering process.

Here, the following description will exemplify processes in which "OKINAKA" and "OKINAWA" have been registered in the word dictionary 13c as recognition words, and by using the respective words, "NOKINAKA" and "OKINAA", as reject word candidates, and any one of these is registered as a reject word relating to the recognition word "OKINAKA" based upon voice data of any one of these reject word candidates.

The voice analyzing unit 10a reads information (file name of a voice data file and reading thereof) of one of the reject word candidates from the text data depicted in FIG. 8. The voice analyzing unit 10a reads voice data of 100 vocalizations stored in the voice data file having the read-out file name, extracts a feature parameter from each piece of read-out voice data, and sends the extracted feature parameter to the voice collation unit 10b.

The voice collation unit 10b of the second embodiment collates each of the feature parameters successively sent from the voice analyzing unit 10a with a word model of the recognition word "OKINAKA" generated by the word model generation unit 10c, and calculates the likelihood ratio indicating the degree of similarity of the two. The voice collation unit 10b transmits the calculated likelihood ratio between each of the feature parameters and the word model of the recognition word "OKINAKA" to the result decision unit 10d.

The result decision unit 10d of the second embodiment specifies a feature parameter having the highest likelihood ratio among the likelihood ratios between each of feature parameters and the word model of the recognition word "OKINAKA", obtained from the voice collation unit 10b, and allows the RAM 12 to store this parameter. More specifically, the result decision unit 10d compares each of the likelihood ratios transmitted from the voice collation unit 10b with a likelihood ratio preliminarily stored in the RAM 12. Upon obtaining a likelihood ratio higher than the likelihood ratio stored in the RAM 12 from the voice collation unit 10b, the result decision unit 10d updates the likelihood ratio and the feature parameter stored in the RAM 12 to the newly acquired likelihood ratio and feature parameter.

When the voice analyzing unit 10a, voice collation unit 10b and result decision unit 10d have finished the above-mentioned processes on all the voice data files whose file names are described on the text data file, the likelihood ratio stored in the RAM 12 at this time has the highest value among likelihood ratios between all the voice data and the word models of the recognition word "OKINAKA". The result decision unit 10d sends the feature parameter stored in the RAM 12, that is, the feature parameter corresponding to the likelihood ratio having the highest value, to the reject word generation unit 10e.

The reject word generation unit 10e generates a maximum likelihood phoneme string from the feature parameter acquired from the result decision unit 10d. Here, the maximum likelihood phoneme string indicates a pattern string (phoneme string) of phoneme that forms an acoustic model string having the highest degree of similarity to the feature parameter, among acoustic models freely coupled with one another on a phoneme basis. The unit of the acoustic model is not limited to the phoneme, but may be a single syllable or multiple syllables.

The reject word generation unit 10e registers the generated maximum likelihood phoneme string in the word dictionary 13c as a phoneme string of the reject word. Here, the reading of the reject word to be registered in the word dictionary 13c may be acquired from the description of the text data depicted in FIG. 8. By carrying out the above-mentioned processes, the reject word generation unit 10e can generate a word dictionary 13c as depicted in FIG. 4 from the word dictionary 13c depicted in FIG. 2A.

By using the above-mentioned processes, the phoneme string (maximum likelihood phoneme string) obtained from the voice data having the highest similarity to the word model of the recognition word that is not desired to be obtained as the result of recognition is registered in the word dictionary 13c as the phoneme string of the reject word. Therefore, even in the case where voice data that is similar in its vocalization to a recognition word that is not desired to be obtained as the result of recognition is inputted, since this voice data is recognized as a reject word, the recognition word (recognition word that is not desired to be obtained as the result of recognition) corresponding to this reject word can be excluded from the result of recognition. Consequently, by carrying out a voice recognition process using the word dictionary 13c in which such reject words have been registered, it becomes possible to prevent erroneous recognition.

Here, the voice data serving as learning data in the present second embodiment may be prepared as sound data obtained from noise, as long as it is voice data different from the voice data of a recognition word to which a reject word is desirably added.

Figure 9:
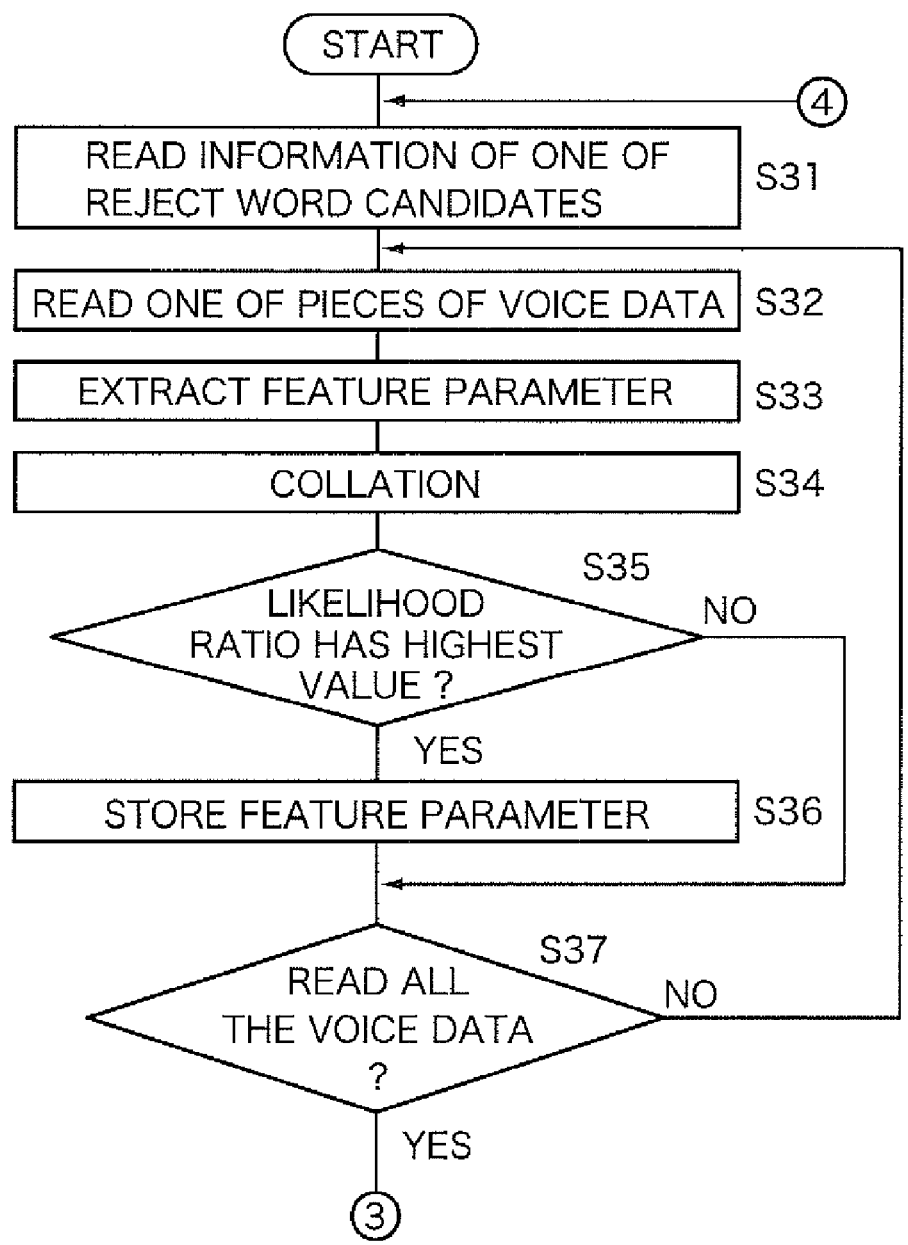
FIG. 9 is an operation chart that depicts an example of a sequence of reject word registering processes.
Figure 10:
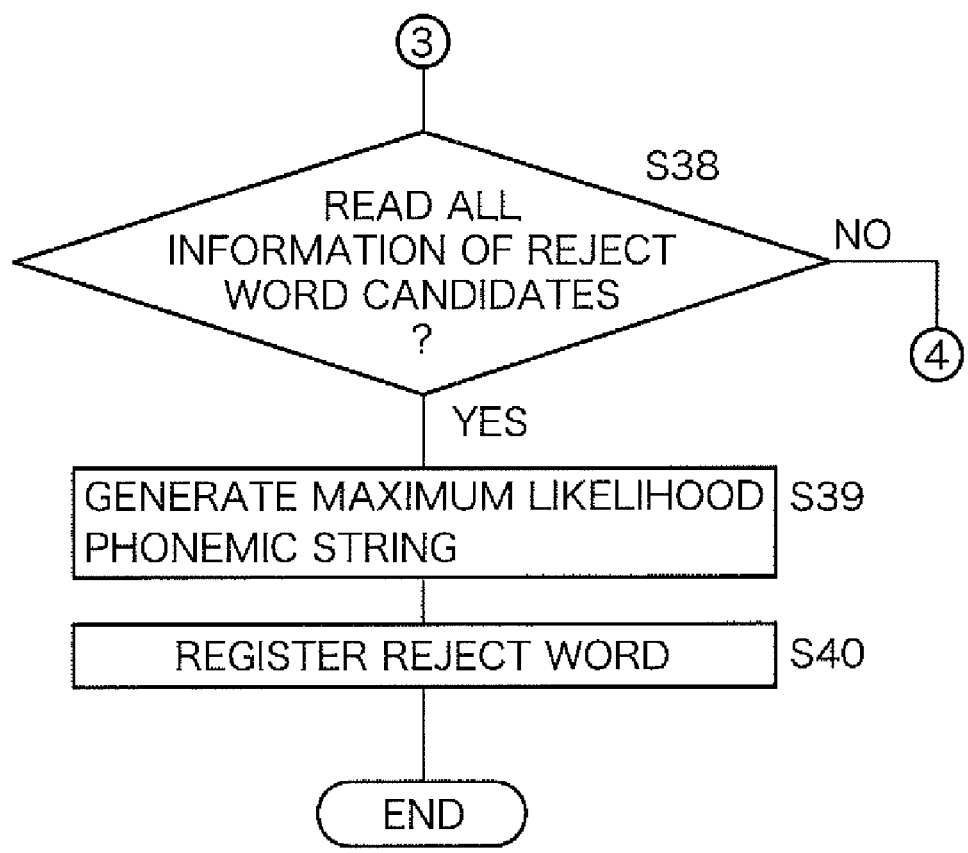
FIG. 10 is another operation chart that depicts an example of a sequence of reject word registering processes.

Referring to an operation chart, the following description will discuss a reject word registering process by the voice recognition apparatus 1 of the present second embodiment in detail. FIG. 9 and FIG. 10 are operation charts that depict a sequence of the reject word registering processes. Here, the following processes are executed by the control unit 10 in accordance with a control program stored in the ROM 11 or the HDD 13 in the voice recognition apparatus 1.

In an attempt to register a reject word relating to any one of the recognition words registered in the word dictionary 13c, the user prepares text data depicted in FIG. 8 and a voice data file whose file name is described in this text data. Then, the user specifies the recognition word on which the reject word is desirably registered and the text data as subjects to be processed, and allows the voice recognition apparatus 1 to execute the reject word registering process.

The control unit 10 (voice analyzing unit 10a) reads information (file name and reading of a voice data file) of one of reject word candidates from the text data (at S31). The control unit 10 (voice analyzing unit 10a) reads one of pieces of voice data stored in the voice data file having the read-out file name (at S32), and extracts a feature parameter from the read-out voice data (at S33).

The control unit 10 (voice collation unit 10b) collates the extracted feature parameter with word models of the recognition word to which the reject word is desirably added generated from the word model generation unit 10c (at S34). The control unit 10 (voice collation unit 10b) calculates a likelihood ratio between the feature parameter extracted from the voice data and the word models of the recognition word to which the reject word is desirably added, and determines whether or not the calculated likelihood ratio thus calculated has the highest value among the likelihood ratios that have been calculated up to now (at S35). More specifically, the control unit 10 (result decision unit 10d) determines whether or not the calculated likelihood ratio is higher than the likelihood ratios already stored in the RAM 12.

Here, the control unit 10 (voice collation unit 10b) may calculate the likelihood ratio between the feature parameter extracted from voice data and word models of all the recognition words and the reject words.

Upon determining that the calculated likelihood ratio is the highest value (at S35: YES), the control unit 10 allows the RAM 12 to store the feature parameter from which the likelihood ratio is obtained (at S36). Upon determining that the calculated likelihood ratio is not the highest value (at S35: NO), the control unit 10 skips the process of operation S36.

The control unit 10 determines whether or not all the voice data stored in the voice data file having the file name read out in operation S31 has been read out (at S37), and upon determining that all the voice data has not been read out (at S37: NO), the process is returned to operation S32. The control unit 10 carries out the processes of the above-mentioned operations S33 to S36 on all the voice data stored in the voice data file having the file name read out in operation S31.

Upon determining that all the voice data stored in the voice data file having the file name read out in operation S31 has been read out (at S37: YES), the control unit 10 determines whether or not all the information of the reject word candidates described in the text data to be processed has been read out (at S38).

Upon determining that all the information of the reject word candidates has not been read out (at S38: NO), the control unit 10 returns the process to operation S31. The control unit 10 reads one of pieces of information of the reject word candidates that have not been processed from the text data to be processed (at S31), and based upon the read-out information, repeats the processes of the above-mentioned operations S32 to S37 thereon.

Upon determining that all the information of the reject word candidates has been read out (at S38: YES), the control unit 10 generates the maximum likelihood phoneme string from the feature parameters stored in the RAM 12 at this time (at S39). The control unit 10 registers the generated maximum likelihood phoneme string as a reject word in the word dictionary 13c in association with the recognition word on which the reject word is to be desirably registered (at S40).

As described above, the voice recognition apparatus 1 of the second embodiment registers as a reject word the maximum phoneme string generated from voice data having a vocalization similar to that of the recognition word to which the reject word is added. Therefore, the word similar to the recognition word can be registered as the reject word.

In the above-mentioned structure, since the recognition word and the reject word are similar to each other, upon vocalization of the recognition word, it might be recognized as the reject word. If, even when a recognition word is vocalized, it is recognized as a reject word, the recognition word is excluded from the result of recognition, and it is not possible to obtain a correct result of recognition. Therefore, even in the case where the reject word is determined through the above-mentioned process, it is desirable to verify that, upon carrying out a voice recognition process on voice data of the recognition word, the reject word is not outputted as the result of recognition.

Third Embodiment

The following description will discuss a voice recognition apparatus in accordance with a third embodiment. Here, since the voice recognition apparatus of the third embodiment can be realized by using the substantially same structure as that of the voice recognition apparatus 1 depicted in FIG. 1 described in the first embodiment, the same structures are indicated by the same reference numerals, and the description thereof is not given.

In the same manner as in the voice recognition apparatus 1 of the first embodiment, the voice recognition apparatus 1 of the third embodiment has the structure in which voice data of a plurality of reject word candidates is subjected to a voice recognition process, and as a result, a word having many vocalizations that are recognized as the recognition word on which a reject word is desirably added is determined as the reject word. Here, in the voice recognition apparatus 1 of the third embodiment, the control unit 10 extracts one portion of a word determined as the reject word, and registers this in the word dictionary 13c as a reject word.

For example, in the case where the control unit 10 carries out a registering process of a reject word on the recognition word "OKINAKA" using text data as depicted in FIG. 2B as a subject to be processed, the same processes as described in the first embodiment are carried out. More specifically, suppose that in the control unit 10, as the result of recognition of voice data vocalized as "OKINA", 10 vocalizations are recognized as "OKINAKA", that, as the result of recognition of voice data vocalized as "OKINAWA", 0 vocalization is recognized as "OKINAKA", and that, as the result of recognition of voice data vocalized as "OKINAA", 30 vocalizations are recognized as "OKINAKA".

The control unit 10 (reject word generation unit 10e) of the third embodiment divides each of reject word candidates "OKINA", "OKINAWA" and "OKINAA" into respective partial patterns. Here, the reject word generation unit 10e divides each of these to respective partial patterns, for example, "OKI", "KINA", "NAWA" and "NAA".

Based upon the number of vocalizations recognized as the recognition word "OKINAKA" for each of the reject word candidates, calculated based upon the result of recognition acquired from the result decision unit 10d, the reject word generation unit 10e calculates the number of vocalizations for each of the divided patterns. Here, since the partial pattern "OKI" is included in the reject word candidates, "OKINA, "OKINAWA" and "OKINAA", the number of vocalizations relating to the partial pattern "OKI" accounts for 40 vocalizations, that is, 10 vocalizations for "OKINA" plus 30 vocalizations for "OKINAA".

In the same manner, the reject word generation unit 10e calculates the number of vocalizations relating to the partial pattern "KINA" as 40 vocalizations, the number of vocalizations relating to the partial pattern "NAWA" as 0 vocalization, and the number of vocalizations relating to "NAA" as 30 vocalizations, respectively. Here, the reject word generation unit 10e determines whether or not each of the partial patterns is one portion of the recognition word "OKINAKA" to which the reject word is to be added, and the partial pattern corresponding to one portion of the recognition word is excluded from the reject word candidates.

Here, since each of the partial patterns, "OKI" and "KINA" forms one portion of the recognition word "OKINAKA", the reject word generation unit 10e excludes the partial patterns, "OKI" and "KINA", from the reject word candidates of the recognition word "OKINAKA". Thus, the reject word generation unit 10e registers the partial pattern "NAA" in the word dictionary 13c as a reject word relating to the recognition word "OKINAKA".

In this manner, the voice recognition apparatus 1 of the third embodiment preliminarily registers one portion of a word that is similar to the recognition word that is not desired to be obtained as the result of recognition in the word dictionary 13c as a reject word relating to the recognition word. Consequently, even when voice data to be processed for voice recognition is recognized as one portion of a word (reject word) that is similar to the recognition word that is not desired to be obtained as the result of recognition, the recognition word similar to this reject word can be excluded from the result of recognition. Therefore, the present third embodiment makes it possible to prevent erroneous recognition, and consequently to improve the precision of recognition.

The above-mentioned voice recognition apparatus 1 of the third embodiment has been described as a modified example of the voice recognition apparatus 1 of the first embodiment; however, this may be applicable to the structure of the voice recognition apparatus 1 of the second embodiment. That is, another structure may be used in which, upon registering a phoneme string (maximum likelihood phoneme string) of a reject word candidate having the highest likelihood ratio to the recognition word to which a reject word is desirably added in the word dictionary 13c as the reject word, one portion of the phoneme string of this reject word candidate is registered in the word dictionary 13c as the reject word.

In the conventional voice recognition apparatuses, in most cases, an unknown word model and a weight to be imposed on the unknown word model are manually determined by using a certain method and registered, and in these cases, it is difficult to determine an optimal unknown word model. Moreover, a reject word to be registered in a reject word dictionary is generated based upon, for example, a feature of a recognition word; in this case, however, such a word as not to be generated as a reject word based upon the feature of the recognition word is not prepared as a rejected word.

As described in the above-mentioned first to third embodiments, by registering a reject word for each of recognition words registered in the word dictionary 13c, it becomes possible to improve the recognition precision without causing adverse effects to the other recognition words registered in the word dictionary 13c. More specifically, in the voice recognition process, it becomes possible to improve the matching rate, with the detection rate being properly maintained.

Here, the detection rate represents a rate of the number of voice data that are correctly recognized actually as the recognition word relative to the number of test data (voice data) that should be recognized as a certain recognition word. Moreover, the matching rate represents a rate of the number of voice data that are correctly recognized as the recognition word relative to the total of the number of voice data correctly recognized as a certain recognition word and the number of voice data erroneously recognized as the recognition word.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification related to a depicting of the superiority and inferiority of the invention. Although the embodiments of the present inventions have been described in detail, it should be understood that the various changes, substitutions, and alternations could be made hereto without departing from the spirit and scope of the invention.

The invention claimed is:

1. A voice recognition apparatus comprising:
   an extraction unit extracting a feature amount from a voice signal;
   a word dictionary storing a plurality of recognition words;
   a reject word generation unit storing reject words in the word dictionary in association with the recognition words; and
   a collation unit calculating a degree of similarity between the voice signal and each of the recognition words and reject words stored in the word dictionary by using the feature amount extracted by the extraction unit, determining whether or not a word having a high calculated degree of similarity corresponds to a reject word, when the word is determined as the reject word, excluding the recognition word stored in the word dictionary in association with the reject word from a result of recognition, and outputting a recognition word having a high calculated degree of similarity as a result of recognition.

2. The voice recognition apparatus according to claim 1, further comprising:
   an input unit inputting a plurality of voice signals with respect to a plurality of reject word candidates relating to a recognition word to which a reject word is added, to the extraction unit; wherein the extraction unit is designed to extract a feature amount from each of the inputted voice signals; wherein
   the collation unit calculates the degree of similarity between the voice signal and each of the recognition words stored in the word dictionary by using the feature amount extracted by the extraction unit, and is designed to output the result of recognition based upon the calculated degree of similarity; and
   the reject word generation unit calculates the number of voice signals each corresponding to a recognition word to which the reject word is added as the result of recognition for each of the reject word candidates based upon the result of recognition outputted by the collation unit, and stores a reject word candidate having a large number of calculations carried out by the reject word generation unit as a reject word relating to the recognition word to which the reject word is added.

3. The voice recognition apparatus according to claim 2, wherein the reject word generation unit is designed to store the reject word candidate having a number of calculations carried out by the reject word generation unit that exceeds a given number in the word dictionary as a reject word relating to the recognition word to which the reject word is added.

4. The voice recognition apparatus according to claim 2, wherein the reject word generation unit is designed to store one portion of the reject word candidate in the word dictionary as a reject word relating to the recognition word to which the reject word is added.

5. The voice recognition apparatus according to claim 3, wherein the reject word generation unit is designed to store one portion of the reject word candidate in the word dictionary as a reject word relating to the recognition word to which the reject word is added.

6. The voice recognition apparatus according to claim 1, further comprising:
   an input unit inputting a plurality of voice signals with respect to a plurality of reject word candidates relating to a recognition word to which a reject word is added, to the extraction unit; wherein the extraction unit is designed to extract a feature amount from each of the inputted voice signals, wherein
   the collation unit calculates the degree of similarity between the voice signal and each of the recognition words stored in the word dictionary by using the feature amount extracted by the extraction unit, and is designed to output the result of recognition based upon the calculated degree of similarity; and the reject word generation unit generates an acoustic model from a voice signal having a high degree of similarity to the recognition word to which the reject word is added, calculated by the collation unit, and stores the generated acoustic model in the word dictionary as a reject word relating to the recognition word.

7. A voice recognition apparatus comprising:
an extraction unit extracting a feature amount from a voice signal, and storing the feature amount in a storage unit;
a word dictionary storing a plurality of recognition words;
a reject word generation unit storing reject words in the word dictionary in association with the recognition words; and
a collation unit calculating a degree of similarity between the voice signal and each of the recognition words and reject words stored in the word dictionary by using the feature amount stored in the storage unit by the extraction unit, determining whether or not a word having a high calculated degree of similarity corresponds to a reject word, when the word is determined as the reject word, excluding the recognition word stored in the word dictionary in association with the reject word from the result of recognition, and outputting a recognition word having a high calculated degree of similarity as a result of recognition.

8. A voice recognition method allowing a voice recognition apparatus including a word dictionary that stores a plurality of recognition words and reject words to output a recognition result based on a feature amount extracted from a voice signal, said voice recognition method comprising:
calculating a degree of similarity between the voice signal and each of recognition words and reject words stored in the word dictionary by using the extracted feature amount;
determining whether or not a word having a high calculated degree of similarity corresponds to a reject word;
when the word is determined as the reject word, excluding the recognition word stored in the word dictionary in association with the reject word from a result of recognition.

9. A computer-readable recording medium storing a computer program comprising:
causing a computer to extract a feature amount from a voice signal;
causing the computer to calculate a degree of similarity between the voice signal and each of recognition words and reject words stored in a word dictionary by using the extracted feature amount;
causing the computer to determine whether or not a word having a high calculated degree of similarity corresponds to a reject word;
when the word is determined as the reject word, causing the computer to exclude the recognition word stored in the word dictionary in association with the reject word from a result of recognition.

* * * * *